Dec. 20, 1966    G. R. STEWART    3,292,602
ROTARY ENGINE
Filed Nov. 2, 1964    2 Sheets-Sheet 1
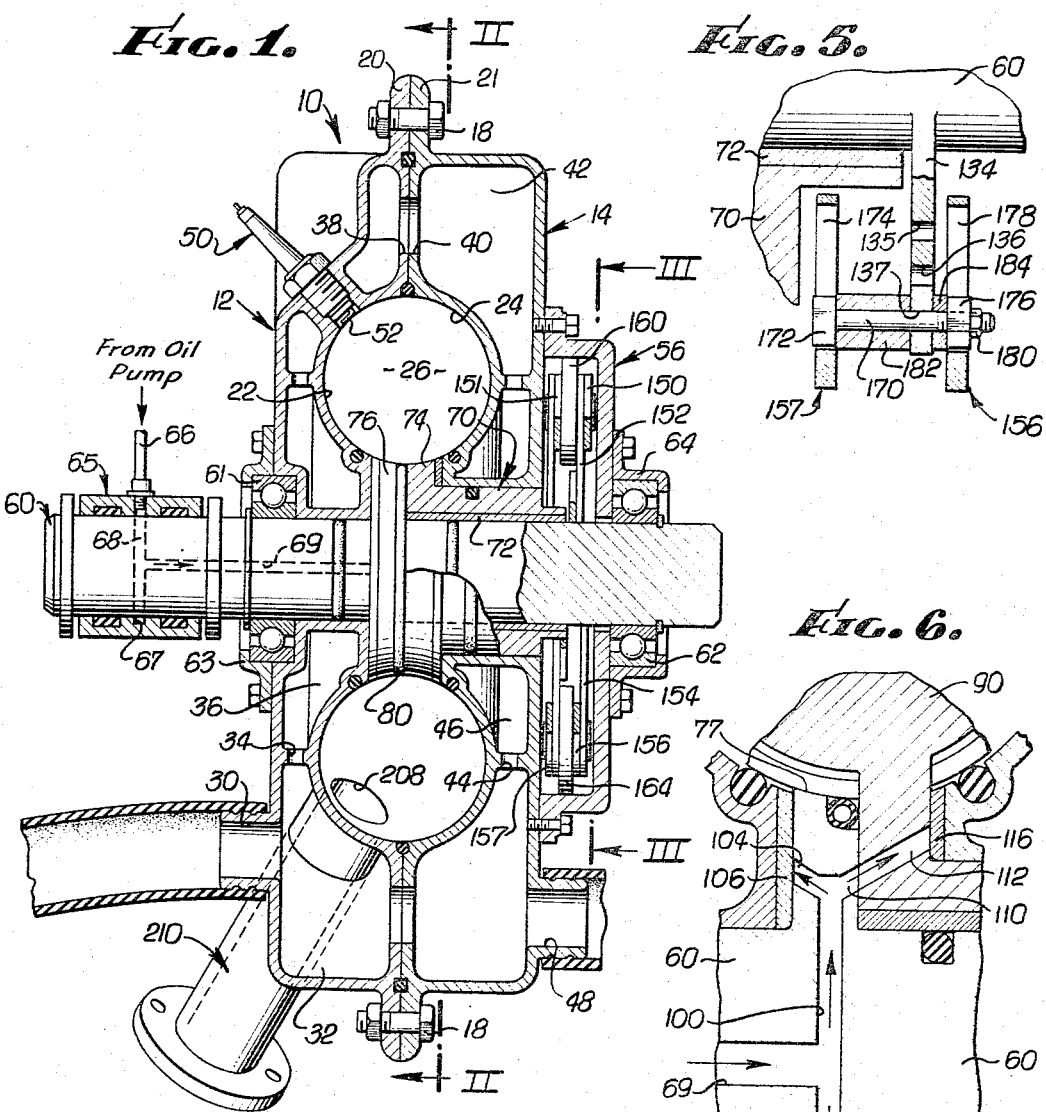
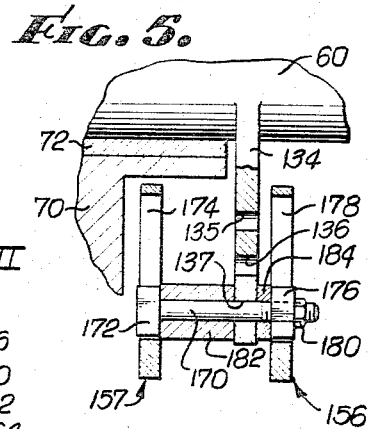
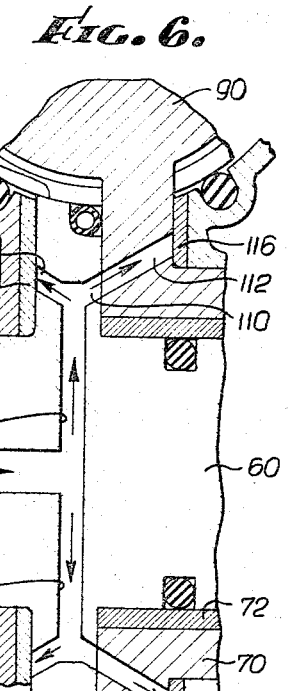
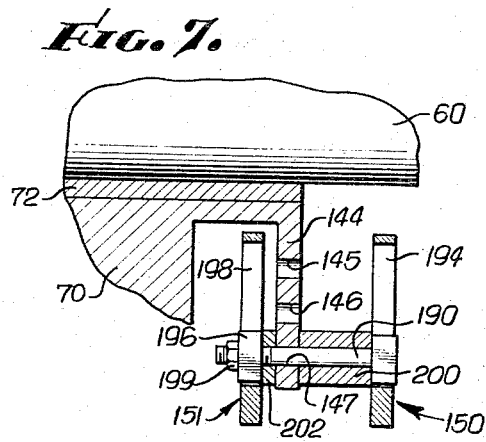
INVENTOR.
GEORGE R. STEWART
BY
Niketta & Glenny
ATTORNEYS.

Dec. 20, 1966

G. R. STEWART 3,292,602

ROTARY ENGINE

Filed Nov. 2, 1964

INVENTOR.
GEORGE R. STEWART
BY
Miketta & Glenny
ATTORNEYS.

United States Patent Office 3,292,602
Patented Dec. 20, 1966

3,292,602
ROTARY ENGINE
George R. Stewart, 10049 Sideview Drive,
Downey, Calif. 90240
Filed Nov. 2, 1964, Ser. No. 408,054
9 Claims. (Cl. 123—11)

This invention relates generally to improvements in the construction of rotary internal combustion engines, and more specifically to such an engine which is extremely compact in construction, which includes means permitting selective adjustment of the compression ratio, and which embodies improved sealing and lubrication means. The present invention is an improvement over prior devices such as that shown in the United States Patent 2,050,603 to Gardner.

The patent just mentioned discloses a rotary engine including piston control means causing the pistons to rotationally oscillate with respect to one another during operation. In accordance with a preferred embodiment of the present invention hereinafter described and illustrated in detail, the piston control means is constructed to afford selective adjustability of the compression ratio, so that the engine can be easily adapted to yield optimum performance for whatever fuel may be desired to be used. Moreover, the cylinder of the present engine is toroidal in shape, and the advantageous compactness of the construction results from the fact that the engine casing is in two annular parts which, when assembled, are joined along a plane perpendicular to the axis of the drive shaft. The engine thus has a high horsepower to weight ratio and can be made at low cost. Its wide range of compression ratios permits its use with conventional carburetion, or with fuel injection. Although the illustrative embodiment is shown as liquid cooled, it will be manifest that the design is adapted for air cooled operation as well.

An object of the present invention is to provide novel improvements in rotary engines, including a piston control means which can be adjusted to select a desired compression ratio.

Another object is to provide, in such an engine, a novel and effective lubrication means and system.

Another object is to provide a rotary engine which has an extremely narrow axial length.

A further object is to provide a highly efficient extremely compact rotary internal combustion engine which can be manufactured at a low cost.

Other objects and many of the attendant advantages of this invention will be readily appreciated as the same becomes better understood by reference to the following detailed description when considered in connection with the accompanying drawings wherein:

FIG. 1 is a vertical sectional view of a rotary engine embodying the present invention.

FIG. 5 is a view taken along plane V—V of FIG. 4.

FIG. 6 is a view taken on the arrows VI—VI of FIG. 2.

FIG. 7 is a fragmentary view taken on the arrows VII—VII of FIG. 3.

Figure 2:
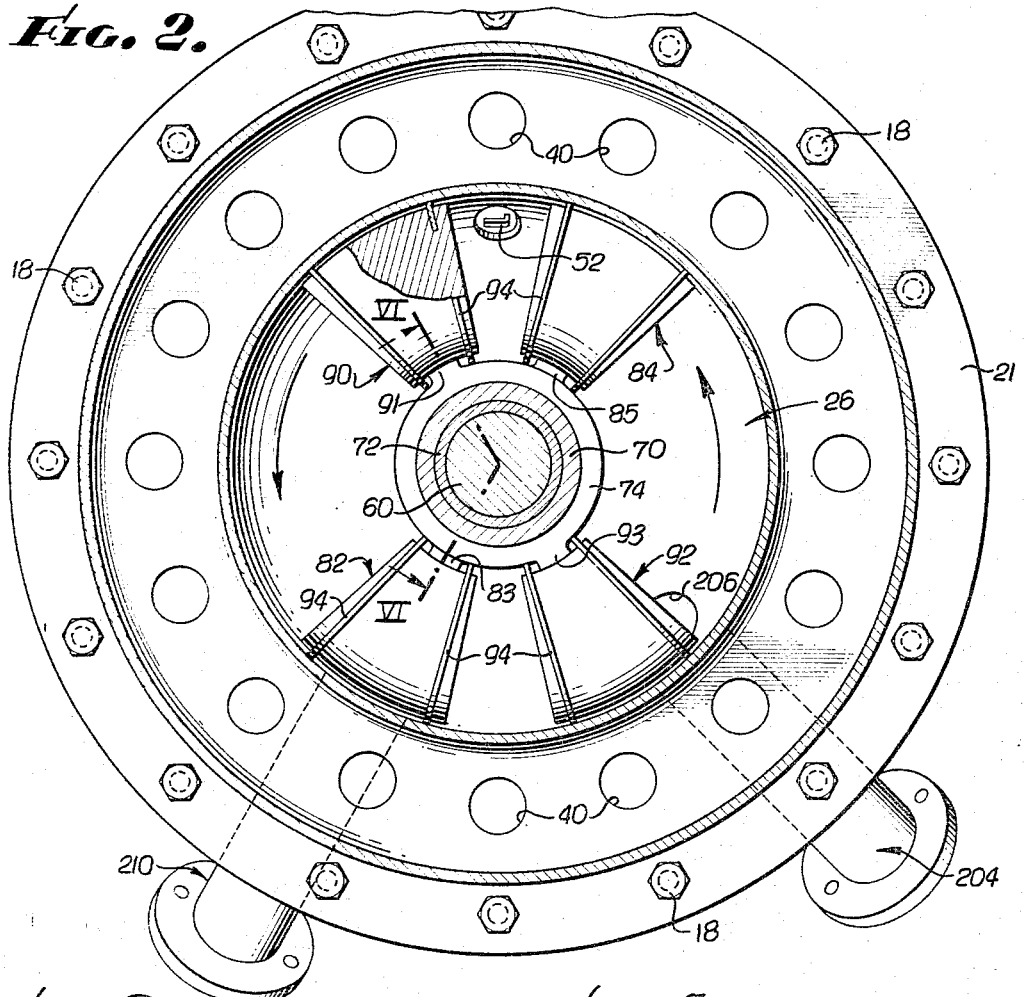
FIG. 2 is a sectional view taken along plane II—II of FIG. 1.

Referring now in detail to the drawings, in FIG. 1 there is indicated generally at 10 an engine casing including two shells indicated generally at 12 and 14 joined along a plane perpendicular to the axis of output drive shaft 60, the shells being held in assembled relation as shown by a series of fastening means 18 arcuately spaced about flanges 20, 21 of the shells. Each shell includes an annular recess of semicircular section 22, 24, which mate to form an annular cylinder indicated generally at 26 in which are mounted the pistons of the engine, to be later described in detail in connection with FIG. 2. Casing 10 includes passages for coolant fluid flow in conventional manner. Thus shell 12 is provided with inlet port 30 communicating with outer annular jacket 32 and, through ports 34, with inner annular jacket 36, while shell 14 receives coolant fluid through mating openings 38 and 40 into outer annular jacket 42 and, through ports 44, into inner annular jacket 46; shell 14 is also provided with a coolant outlet port 48. A conventional spark plug indicated generally at 50 includes sparking electrode assembly 52 in a recess formed in shell 12 adjacent cylinder 26.

Centrally of the outer face of shell 14 there is mounted a housing indicated generally at 56 for the piston control assembly to be later described. A drive shaft indicated generally at 60 is mounted axially of annular cylinder 26 and is rotatably supported on bearings 61 and 62 held in place by retainer caps 63 and 64 respectively fastened to shell 12 and housing 56. Oil or other lubricant is supplied through a stationary oil transfer sleeve indicated generally at 65 from a pressurized supply conduit 66, the sleeve being formed with an internal annular groove 67 communicating through one or more radial channels 68 in shaft 60 to axial passageway 69 extending rightwardly within the shaft as seen in FIG. 1.

A tubular countershaft indicated generally at 70 is rotatably mounted concentrically on shaft 60, desirably with a bearing sleeve 72 therebetween. Countershaft 70 is provided at its left end as seen in FIG. 1 with an outwardly extending annular flange 74, and drive shaft 60 is similarly provided with an annular flange 76, the two flanges having annular faces juxtaposed in slidable sealing relation along a plane 78 (see FIG. 6) perpendicular to the common axis of shafts 60 and 70. Sealing means such as an O-ring 80 may be provided in a recess of flange 76.

The rotary engine of the present invention includes in its annular cylinder 26 a pair of diametrically oppositely disposed pistons fixed to the drive shaft 60, such pistons being herein referred to as "drive" pistons; and a pair of diametrically oppositely disposed pistons fixed to the countershaft 70, the latter pistons being herein referred to as "compression" pistons. In accordance with known operation of rotary engines, the drive pistons and the drive shaft fixed thereto rotate at substantially constant speed, while the compression pistons and the countershaft fixed thereto rotate with an oscillatory motion superimposed upon the rotational motion.

In the present illustrative embodiment of the invention, and with particular reference to FIG. 2, a pair of drive pistons indicated generally at 82 and 84 are slidably mounted in the annular cylinder 26, and are fixed to flange 76 of shaft 60 by short arms 83 and 85 respectively extending radially from flange 76. Also slidably mounted in the annular cylinder 26 is a pair of oppositely disposed compression pistons indicated generally at 90 and 92, fixed to the outer ends of short arms 91 and 93 respectively extending outwardly from flange 74 of countershaft 70. Each of the pistons 82, 84, 90 and 92 is circular in radial section and sector-shaped as seen in FIG. 2, each of the pistons extending arcuately of cylinder 26. Each of the pistons, moreover, may be provided with one or more piston rings 94, each received in a ring groove formed in the outer surface of the respective pistons, in accordance with known construction. It may be noted that the showing in FIG. 2 is somewhat exaggerated as to the clearance between the several pistons and the side wall of cylinder 26, for clarity of presentation. It may be noted also, as seen in FIG. 6, that the outermost faces of flanges 74 and 76 are formed in arcuate concave configuration as indicated at 75 and 77 respectively so that such arcuate portions form, in effect, part of the inner wall defining the annular cylinder 26.

The operation of the lubrication system of the present engine will be understood by further reference to FIG. 6. Thus pressurized oil in axial conduit 69 of shaft 60 moves radially outwardly of the shaft through one or more radial passageways 100 and 102 formed in the shaft. Passageway 100 extends outwardly into flange 76 and is bifurcated at its outer end, a portion of the oil moving leftwardly as seen in FIG. 6 through channel 104 to lubricate annular bushing 106 which provides slidable bearing between flange 76 and the annular face of shell 12. The fit of the parts is such that there is a clearance of the order of 0.001 inch between the bushing 106 and flange 76, whereby oil from channel 104 moves radially outwardly as seen in FIG. 6 to cylinder 26 for lubrication of the cylinder wall.

The other branch channel 110 of passageway 100 communicates with channel 112 formed in flange 74 for supplying oil to annular bushing 116 providing bearing between shell 14 and the annular face of flange 74. As in the case of bushing 106 above described, a clearance of the order of 0.001 inch exists between bushing 116 and the face of flange 74, whereby oil may move radially outwardly to assist in lubricating the wall of cylinder 26. Since countershaft 70 and its flange 74 are oscillatorily movable relative to shaft 60 and its flange 76, one or both of the channels 110 and 112 are arcuately enlarged, in order to provide continuous flow of oil as shown by the arrow extending between said channels, during oscillatory movement of countershaft 70. Additionally, channel 110 supplies a thin film of oil between the relatively sliding faces of flanges 74 and 76.

Figure 3:
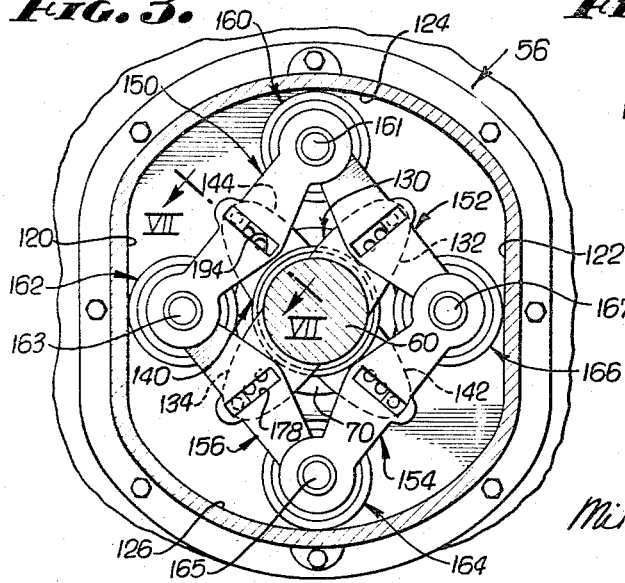
FIG. 3 is a view taken along plane III—III of FIG. 1.

The piston control means are mounted within the housing 56, and are shown in detail in FIG. 3. As there appears, housing 56 includes an inner wall of somewhat elliptical contour, including straight side portions 120 and 122 and arcuate end portions 124 and 126, forming a continuous camming surface for the rollers of the piston control means as will be described below.

The piston control means includes a pair of cranks, each including oppositely extending crank arms, one of the cranks being fixed to shaft 60 and the other crank being fixed to countershaft 70. The detailed construction is best seen in the enlarged fragmentary views of FIGS. 5 and 7. Thus a crank indicated generally at 130 is fixed to shaft 60 and includes oppositely directed crank arms 132 and 134. Each of the crank arms 132 and 134 is provided with a plurality of pairs of holes extending therethrough, the holes being spaced longitudinally of the arms. In the present illustrative embodiment of the invention, there are three pairs of holes formed in crank 130, the holes in crank arm 134 being individually indicated at 135, 136, and 137, in sequence of increasing radii from the center of shaft 60 to which arm 134 is fixed.

A similar crank, indicated generally at 140, is fixed to countershaft 70 and includes a pair of oppositely extending crank arms 142 and 144, each provided with a plurality of pairs of holes formed therethrough, in the manner of crank 130 and its arms 132 and 134 heretofore described, the holes in crank arm 144 being indicated in FIG. 7 at 145, 146 and 147 respectively in sequence of increasing radii from the center of countershaft 70.

With further reference to FIG. 3, the piston control means within housing 56 includes a linkage assembly made up of four pairs of links pivotally connected at their ends to form a parallelogram. The links of each pair are of equal length and lie in spaced parallel planes perpendicular to the common axis of shafts 60 and 70. In FIG. 3 one link of each of the four pairs is seen, indicated generally at 150, 152, 154 and 156, it being understood that the other link of each pair is aligned immediately each of the numbered links as seen in FIG. 3. Thus, in FIG. 5 link 156 is seen, as well as link 157, these two links forming one of the four pairs. Similarly, in FIG. 7 there is shown link 150 and link 151, these two links forming another of the four pairs of links in the linkage assembly.

The pivotal connections between successive pairs of links around the parallelogram as seen in FIG. 3 include rollers mounted on pivot pins, the rollers being indicated generally at 160, 162, 164, and 166 and the respective pivot pins being indicated at 161, 163, 165, and 167. As will be seen, the rollers are in rolling contact with the camming surface of housing 56 including the portions 120, 122, 124 and 126 previously described.

Means are provided for pivotally connecting cranks 130 and 140 to the links just described. In the present illustrative embodiment of the invention, such connections include (see FIG. 5) a pivot pin 170 extending through hole 137 formed in crank arm 134. The head 172 of pin 170 is desirably rectangular in shape and is slidably received in a slot 174 formed in link 157, the slot extending normal to the longitudinal axis of the link and being spaced midway of its length. Similarly, the other end of pivot pin 170 is provided with a rectangular member 176, which is slidably received in a slot 178 formed in link 156, the slots 174 and 178 being parallel and coextensive. The pivot pin 170 is retained in position by suitable fastening means such as a nut 180 threaded on the end of the pin, and spacer members 182 and 184 are desirably provided, the pivot pin 170 extending through bores in the spacer members so that the parts seen in FIG. 5 are retained in their relative position as shown during operation. The other crank arm 132 of crank 130 is similiarly connected to the pair of links including link 152.

The other crank 140 is similarly connected to the other two pairs of links making up the linkage assembly. Thus, with specific reference to FIG. 7, a pivot pin 190 includes an enlarged rectangular head 192 slidably received in a slot 194 formed in link 150 and a rectangular member 196 is slidably received in slot 198 formed in link 151. Pivot pin 190 is retained in position by suitable means such as a nut 199 threaded thereon, and spacer member 200 and 202 may be provided, each including a central bore formed therein, for maintaining the parts in their positions as seen in FIG. 7 during operation.

Rotation of the pistons and of shafts 60 and 70 to which they are fixed is assumed to be counterclockwise as seen in FIG. 2. An intake tube indicated generally at 204 supplies a fuel and air mixture from a carburetor (not shown) through port 206 to cylinder 26. The mixture is then compressed by reason of the decreasing volume between successive pistons resulting from the oscillatory component of movement of compression pistons 90 and 92 by operation of the piston control means above described. The compressed mixture is ignited by spark plug 50 energized by conventional electrical and timing means not shown. The power stroke thus occurs during piston travel through approximately the upper left quadrant as seen in FIG. 2, followed by the exhaust stroke during which the burned gases are expelled through port 208 into an exhaust pipe indicated generally at 210.

Figure 4:
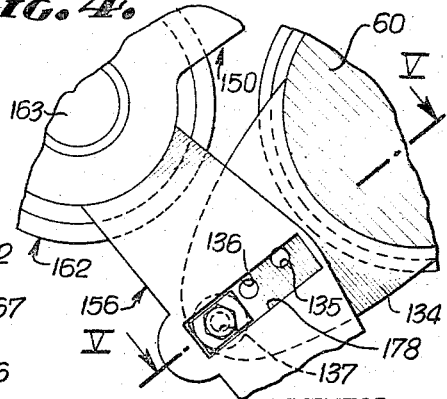
FIG. 4 is a fragmentary view on an enlarged scale of one of the connections between the links and arms shown in FIG. 3.

It will be seen that the compression ratio of the present engine is a function of the magnitude of the oscillatory component of movement of the compression pistons 90 and 92 relative to drive pistons 82 and 84. Such oscillatory component results from the operation of the piston control means including the linkage assembly in housing 56, and particularly by the cyclically changing shape of the linkage parallelogram, translated into oscillatory relative movement between cranks 130 and 140. It is especially to be noted that the translation just referred to results from the link-crank relations described in connection with FIGS. 5 and 7, and the magnitude of the oscillatory component can be controlled by the user by selection of appropriate holes in the crank arms for mounting pivot pins such as 170 and 190 therein. In the drawings the parts are shown assembled to cause a relatively low compression ratio. A higher ratio may be had, when desired, by removing the pivot pins and repositioning them in crank arm holes closer to the center of the cranks. The changed angular relationships resulting from such repositioning will be understood by noting, in FIGS. 3 and 4, the angular inclination of the line of crank holes and the axis of the link slots.

Accordingly, the present invention provides means for easy conversion of the engine to optimize its performance with fuel of given characteristics. The lubrication system is simple and effective, since the oil is introduced centrally of the shaft and moves outwardly under its own pressure assisted by centrifugal force to lubricate the several relatively moving surfaces, and no return path is needed since the oil is burned in the cylinder along with the fuel during operation.

It will be understood that details of construction may be modified or varied from the illustrative forms shown within the scope of the invention. For example, the engine may be air cooled rather than liquid cooled as shown; the slidable adjustable engagement of links and arms in the piston control means may be provided by slotted arms and apertured links; and fuel supply to the engine may be accomplished by carburetion or fuel injection. Such modifications and variations not substantially departing from the spirit of the invention are intended to be embraced by the appended claims.

I claim:
1. A rotary engine comprising:
   a housing having an annular cylinder formed therein;
   a drive shaft mounted for rotation about an axis centrally of said annular cylinder;
   a countershaft mounted for rotation coaxially with said drive shaft;
   a pair of spaced drive pistons slidably carried in the cylinder and connecting means fixedly mounting said pistons to the drive shaft;
   a pair of spaced compression pistons slidably carried in the cylinder in alternating relation with the drive pistons, and connecting means fixedly mounting the compression pistons to the countershaft;
   and piston control means for oscillatorily moving the compression pistons relative to the drive pistons during shaft rotation, including means for selectively adjusting the magnitude of the oscillatory movement.

2. The invention as stated in claim 1 wherein the piston control means comprises a crank fixed to each of said shafts and extending radially from said axis, a linkage assembly including four links pivotally connected to form a parallelogram and means for cyclically varying the interior angles of the parallelogram, and the selectively adjusting means includes means for pivotally connecting a point intermediate the ends of a link to a crank at a point at a selected radius from said axis.

3. The invention as stated in claim 2 wherein the selectively adjusting means includes means for pivotally connecting a point intermediate the ends of one of the links pivotally connected to said first named link to the other crank at a point at a selected radius from said axis.

4. The invention as stated in claim 1 wherein said countershaft is tubular and is rotatably mounted on the drive shaft, and each of the two connecting means includes a flange, said flanges including smooth juxtaposed faces in sliding contact.

5. The invention as stated in claim 4 wherein said drive shaft is provided with an axial bore and a channel extending outwardly from the bore into the drive shaft flange and to said juxtaposed faces, and including means for supplying pressurized oil to said bore.

6. The invention as stated in claim 5 wherein said housing consists of mating shells, each including a smooth annular portion in slidable relation with one of said flanges along a second smooth face thereof spaced from the first named flange face.

7. The invention as stated in claim 6 wherein the drive shaft flange has formed therein a second channel communicating at its one end with said first named channel and at its other end with the second smooth face of the drive shaft flange.

8. The invention as stated in claim 6 wherein the countershaft flange has formed therein a channel communicating at its one end at least periodically with said first named channel and at its other end with the second smooth face of the countershaft flange.

9. The invention as stated in claim 6 wherein said smooth faces are normal to said axis.

No references cited.

MARK NEWMAN, *Primary Examiner.*

F. T. SADLER, *Assistant Examiner.*